United States Patent [19]

Natusch

[11] 4,361,083
[45] Nov. 30, 1982

[54] APPARATUS FOR TREATING A FOODSTUFF

[75] Inventor: Hans-Jörg Natusch, Bietigheim-Bissingen, Fed. Rep. of Germany

[73] Assignee: Societe D'Assistance Technique Pour Produits Nestle S.A., Lausanne, Switzerland

[21] Appl. No.: 219,862

[22] Filed: Dec. 23, 1980

[30] Foreign Application Priority Data

Dec. 28, 1979 [DE] Fed. Rep. of Germany ....... 2952544

[51] Int. Cl.³ .......................... A23L 3/00; B01F 15/02
[52] U.S. Cl. ........................................ 99/483; 99/278; 99/348; 366/147; 366/157; 366/279

[58] Field of Search ................. 99/348, 495, 483, 509, 99/510, 516, 278; 366/76, 77, 279, 79, 81, 98, 101, 102, 132, 134, 144, 147, 168, 172, 173, 186, 190, 195, 196, 318, 319, 161, 90, 322, 329, 603, 156–158; 100/117, 145; 425/207, 208

[56] References Cited

U.S. PATENT DOCUMENTS

| 3,176,606 | 4/1965 | Zoffman | 99/278 |
| 3,754,735 | 8/1973 | Hoyle et al. | 366/132 |
| 3,999,474 | 12/1976 | Sienkiewicz et al. | 99/483 X |
| 4,010,001 | 3/1977 | Dollinger | 366/172 X |
| 4,269,798 | 5/1981 | Ives | 366/76 X |

Primary Examiner—Philip R. Coe
Assistant Examiner—Timothy F. Simone
Attorney, Agent, or Firm—Vogt & O'Donnell

[57] ABSTRACT

An apparatus for mixing particulate material and a liquid comprising an inclined screw barrel with a conveying screw, wherein the screw barrel projects beyond the last screw flight and in this region comprises inlets for streams of liquid.

4 Claims, 1 Drawing Figure

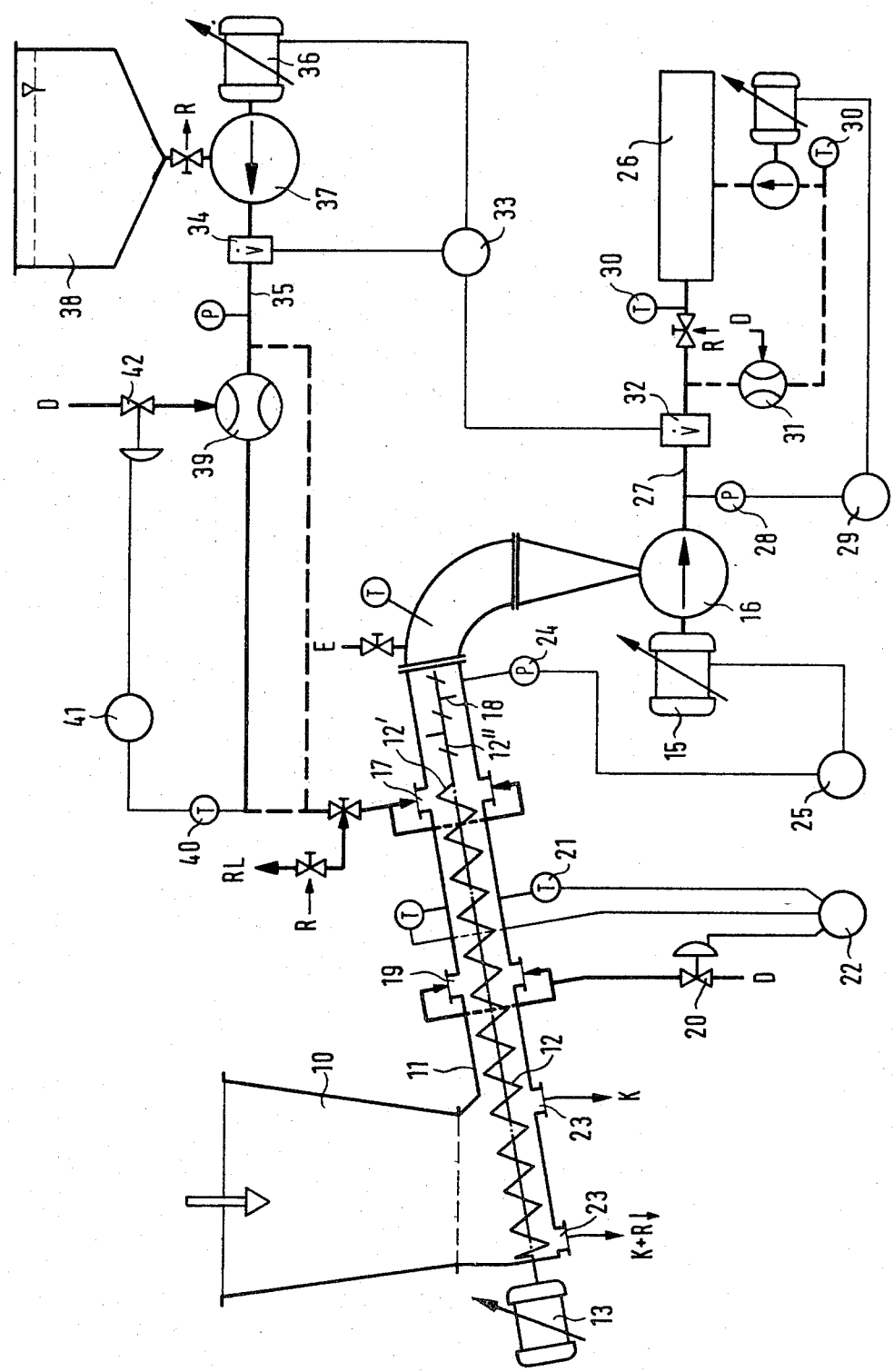

APPARATUS FOR TREATING A FOODSTUFF

This invention relates to an apparatus for treating, particularly mixing and heating, a foodstuff of particulate material and liquid comprising an inclined screw barrel with a conveying screw arranged therein.

One such apparatus is known from GB-PS No. 1,521,003, according to which an already prepared mixture is to be pasteurised for a certain residence time, for which purpose the mixture first passes through a heat exchanger and then is delivered to a screw conveyor, the filling level being less than half the height of the screw conveyor which is arranged sloping upwards from its inlet end to its outlet end. A controlled atmosphere may be introduced into the screw conveyor through openings. There is no mention of mixing.

In addition, U.S. Pat. No. 2,309,989 describes an apparatus for boiling corn in which optionally preheated water is quasi-continuously added to and mixed with the corn in a screw conveyor, followed by preheating with steam in several stages. However, it is not possible with apparatus of this type to pasteurise foods containing a high proportion of large particles in a low-viscosity liquid because the two components cannot be prevented from separating.

The object of the present invention is to provide an apparatus as defined above by which it is possible effectively to mix liquid with large particles and, at the same time, effectively to heat the large particles, with minimal mechanical stressing, within narrow temperature limits.

According to the invention, this object is achieved in that the screw barrel projects beyond the last flight and, in this region, comprises inlet openings for streams of liquid heated to a certain temperature.

In this way, the particles are premixed by coating with the liquid at the outlet end of the screw conveyor, intimate mixing being subsequently obtained by the delivery pump.

The apparatus according to the invention is suitable for processing liquids, particularly high-viscosity liquids, and discrete particles which do not necessarily have to be cut into a certain shape, the particles being processed continuously and in-line with very little mechanical stressing. The particles may assume any form, for example they may be in the form of cubes, chips, strips or slices. Alternatively, natural whole raw materials may even be used. Particle sizes characterised by edge lengths of for example from 2-3 mm to 25-300 mm may be used. Where liquids of relatively lower viscosity are used, the particle size should be correspondingly smaller, depending on the product. The particles may make up from 10 to 80% and preferably from 20 to 70% of the end product.

The apparatus according to the invention may be used for the production of end products or intermediate products which do not have to be sterilised. Mixing may even be carried out in vacuo. The apparatus according to the invention is suitable for example for delicatessen products, for example delicatessen salads, dressings, sauces of different viscosity, sandwich spreads, ketchups of different kinds, baby food, dietetic products, such as food for the aged, complete dishes, soups stews, fresh products such as, for example, yoghurt/curd desserts with incorporated particulate ingredients, or for the production of intermediate products, for example so-called mashes, for the production of mustard or for special extraction processes, the fine size-reduction which is often necessary being carried out as wet size-reduction after the components have been combined in a closed system.

The mixed product leaves the apparatus at the temperature required for packaging. The apparatus has a small volume and can be started up and stopped in a short space of time. Mixing and pasteurising are carried out in the complete or substantial absence of air without any air-locks or intermediate vessels.

Further embodiments of the invention are defined in the Subsidiary Claims.

The FIGURE describes the invention in more detail in the following with reference to the embodiment diagrammatically illustrated by way of example in the accompanying drawing.

The illustrated apparatus comprises a funnel-shaped feed hopper 10 for distributing particulate material. The feed hopper 10 is open at its lower end and communicates with the inlet end of a screw barrel 11 which is arranged sloping upwards towards its outlet end. A conveying screw 12 with an axial outlet is mounted in the screw barrel 11 and is driven by a motor 13. In this way, the particulate material may be directly removed from the feed hopper 10 by means of the conveying screw 12 and is conveyed upwards in the screw barrel 11 to the outlet end of the conveying screw 12 of which the last flight 12' is set back in the conveying direction in the screw barrel 11 so that the screw barrel projects beyond the last screw flight 12'.

In the vicinity of the last screw flight 12', or downstream thereof, the screw barrel 11 is provided with inlet openings 17 for the liquid to be mixed with the particulate material. The liquid is preferably introduced into the screw barrel 11 from at least two sides. The liquid is removed from the container 38 by means of a delivery pump 37 and may be heated by means of a steam injection unit 39. The steam injection unit is controlled through a temperature sensor 40, a controller 41 and a valve 42.

The metering of the particulate material by the conveying screw 12 and the introduction of the liquid are themselves sufficient to provide a pre-mixed product. However, the quality of mixing may be improved by mixing blades 18 arranged on the extended screw shaft 12''.

The screw barrel 11 further comprises steam inlets 19, for example in the form of individual nozzles or an annular nozzle, between its inlet end and the last screw flight 12', the amount of steam introduced being regulated by a valve 20 which is controlled by a control circuit 22 connected and responsive to a temperature sensor 21, the temperature sensor 21 being arranged downstream of the steam inlets 19. In this way, the particulate material which is conveyed by the conveying screw can be effectively pasteurised within narrow temperature limits with minimal mechanical stressing of the large particles.

Upstream of the steam inlets 19, the screw barrel 11 is provided with one or more condensate outlets 23 through which the steam introduced through the steam inlets 19 and condensed is removed.

At its front end (in the conveying direction), the screw barrel 11 is connected by a short pipe of large cross-section to a discharge pump 16 which is driven by a motor 15. The speed of this motor is controlled by a controller 25 responsive to a pressure sensor 24. In this way, the screw barrel 11 may be operated under a given pressure.

Because of product-specific requirements, positive displacement pumps, adapted to the fragility of the particles, their size and the throughput, are used for the discharge pump 16. Large-chamber rotary piston pumps are preferably used for this purpose, above all in the case of large and/or fragile particles. Pumps of this type generally produce the mixing effect still required to obtain a homogeneously mixed end product through their mode of operation, with the result tht there is no need for further in-line mixers. The product is usually directly conveyed to a packaging station 26 providing it already is at the necessary temperature, otherwise it is first heated to the required temperature by a steam injection unit 31.

The packaging station 26 may optionally be controlled in regard to its speed of operation by the pressure prevailing in the pipe 27 leading from the dischrge pump 16 to the packaging station 26 via a pressure sensor 28, a controller 29 and, optionally, by the temperature of the product to be packaged via a temperature sensor 30 which controls the steam injection unit 31.

In the pipe 27 there is a throughflow meter 32 for the product delivered to the packaging station 26. This throughflow meter 32 is connected to an adjustable proportional controller 33 which, at a second input, is connected to another throughflow meter 34 installed in the feed pipe 35 carrying the liquid to the inlet openings 17. Accordingly, the controller 33 controls the drive 36 of a delivery pump 37 by which the liquid is removed from a container 38.

The liquid may be heated, in particular before it is introduced into the screw barrel 11, by means of a heating unit, particularly in the form of a steam injection unit 39, for example an annular slit nozzle, so that the combining and mixing of the particulate material with the liquid may already occur at the desired temperature. In that case, there is generally no need for subsequent heating by the steam injection unit 31. This is of particular advantage in the case of products having a fairly high concentration of large particles where hitherto heating of the particles with minimal mechanical stressing and within narrow temperature limits has been extremely difficult. Most of the condensate introduced into the mixture in this way is removed through the condensate outlets 23. The steam injection unit is controlled by way of a temperature sensor 40, a controller 41 and a steam inlet valve 42.

It is also possible to work in a vacuum. To this end, the means by which the particles are introduced into the hopper 10, maintained under vacuum, have to be made vacuum-tight. In addition, measures have to be taken to generate an excess pressure at the liquid pump 37, for example by the provision of diaphragms or nozzles. The discharge pump 16 has to deliver without interruption from the vacuum. If necessary, this pump 16 may be assisted by a vacuum in the pipe 27.

Since the solid component and the liquid component are separately heated to the necessary temperature by the direct injection of steam, the apparatus may be stopped and started up again in a short space of time. The apparatus may be coupled to a continuous emulsifying machine. In this case, too, the emulsion need only be heated once.

The apparatus may be cleaned in-line. The cleaning circuit is denoted by the corresponding arrows and the letter "R" and provides for problem-free cleaning. The letters "RL" denote the return flow. The steam inlet points are denoted by the letter "D" and the condensate outlets by the letter "K".

I claim:

1. An apparatus for mixing and heating a foodstuff of particulate material with a liquid comprising:
   (a) a means for introducing particulate material;
   (b) an inclined barrel extending upwardly from and in communication with the means for introducing the particulate material, said barrel terminating at an upper discharge end;
   (c) a conveyor screw rotatably mounted in said barrel to convey particulate material upwardly through the barrel towards the discharge end, said conveyor screw having a plurality of screw flights including a first and last screw flight (12');
   (d) a mixing zone within said barrel formed by the barrel projecting beyond the last screw flight (12'), said zone being defined by the walls of the barrel, the last screw flight (12') and the discharge end of the barrel;
   (e) at least two opposing liquid inlet openings in said barrel positioned in the mixing zone; and
   (f) a means for introducting streams of heated liquid into said liquid inlet openings such that the liquid mixes with and heats the particulate material in the mixing zone and a premix of particulate material/liquid is discharged from the discharge end of the barrel.

2. The apparatus of claim 1 further comprising:
   (a) a discharge pump (16) having an inlet and an outlet;
   (b) a short length of pipe connecting and in communication with the discharge end of the barrel to the inlet of the discharge pump;
   (c) a pressure sensing means for determining the pressure at the discharge end of the barrel; and
   (d) a controlling means for controlling the rotational speed of the discharge pump being responsive to the pressure sensing means to maintain a substantially constant pressure at the discharge end of the barrel.

3. The apparatus of claim 1, wherein the conveying screw has an extended shaft located in the said mixing zone on which outwardly extending mixing blades are circumferentially arranged.

4. The apparatus of claim 1, wherein the barrel is provided with one or more steam inlet openings positioned upstream of the liquid inlet openings for pasteurizing the particulate material.

* * * * *